United States Patent [19]
Carlin et al.

[11] 3,796,266
[45] Mar. 12, 1974

[54] SURFACTANT OIL RECOVERY PROCESS
[75] Inventors: Joseph T. Carlin; Kenoth H. Flournoy; Ricardo L. Cardenas, all of Houston, Tex.
[73] Assignee: Texaco Inc., New York, N.Y.
[22] Filed: Dec. 13, 1972
[21] Appl. No.: 314,869

[52] U.S. Cl............. 166/305 R, 166/273, 166/274, 252/8.55 D
[51] Int. Cl............................................. E21b 43/22
[58] Field of Search................... 166/270, 273–275, 166/305 R; 252/8.55 D

[56] References Cited
UNITED STATES PATENTS

| | | | |
|---|---|---|---|
| 1,894,759 | 1/1933 | DeGroote | 166/275 |
| 2,267,548 | 12/1941 | Berl | 166/275 |
| 2,761,841 | 9/1956 | Brown et al. | 252/8.55 D |
| 3,170,514 | 2/1965 | Harvey et al. | 252/8.55 D X |
| 3,360,043 | 12/1967 | Braden, Jr. et al. | 166/272 |
| 3,444,931 | 5/1969 | Braden, Jr. | 166/305 R |

*Primary Examiner*—Stephen J. Novosad

[57] ABSTRACT

An aqueous solution comprising an alkalinity agent such as sodium hydroxide, a water soluble guanidine salt such as guanidine hydrochloride and an anionic surfactant such as an aliphatic sulfate, specifically dodecyl sulfate or cetyl sulfate, or a water soluble salt of an unsaturated aliphatic monobasic carboxylic acid, such as sodium oleate, is injected into a subterranean petroleum containing formation, followed by the injection of water to displace a surfactant-guanidine solution through the formation. A plurality of benefits result from the use of this combination, including increased injection solution viscosity for mobility ratio improvement, inhibition of clay swelling which causes formation permeability damage, and improved salt tolerance of the surfactant solution so that surfactant-emulsion flooding may be carried out in subterranean petroleum containing formations whose formation water salinity is as high as 4 percent.

21 Claims, No Drawings

SURFACTANT OIL RECOVERY PROCESS

BACKGROUND OF THE INVENTION

1. Field of the Invention

This invention pertains to an oil recovery process. More particularly, this invention pertains to an oil recovery process employing an aqueous solution containing an anionic surfactant and a water soluble guanidine compound.

2. Prior Art and Background

Petroleum is found in subterranean formations or reservoirs in which it has accumulated, and recovery is accomplished initially by penetrating the reservoirs with one or more wells and pumping or permitting the petroleum to flow to the surface of the earth through these wells. Petroleum can be recovered from subterranean petroleum containing formations only if certain conditions are present. For example, there must be an adequately high concentration of petroleum in the formation, and there must be sufficient permeability or interconnected flow channels throughout the formation to permit the flow of fluids therethrough if sufficient pressure is applied to the fluid.

When the subterranean petroleum containing formation has natural energy present in the form of underlying active water drive, solution gas, or a high pressure gas cap above the petroleum within the formation, this natural energy is utilized initially to recover petroleum. This initial phase of petroleum recovery is referred to as primary recovery. When this natural energy source is depleted, or in the instance of those formations which do not originally contain sufficient natural energy to permit primary recovery operations, some form of supplemental recovery process must be utilized. Supplemental oil recovery is frequently referred to as secondary recovery, although in fact it may be primary, secondary or tertiary in sequence of employment.

The most commonly utilized and economical form of supplemental recovery is water flooding, which involves the injection of water into the formation to supply the energy necessary to displace oil toward producing wells, where it is transported to the surface. Although it is generally possible to recovery some additional oil by means of water flooding, from 30 to 60 percent of the oil originally in place in the formation still remains in the formation at the conclusion of a conventional water flooding operation. The failure of water flooding to recover this remaining oil stems from a plurality of problems discussed below, which have a cumulative effect on the overall oil recovery program.

When water is forced through a capillary such as the flow channels present in subterranean petroleum containing formations, said flow channel contaning both oil and water, the efficiency with which the injected water displaces the petroleum in the formation is relatively low. This inefficient capillary displacement occurs because water and oil are immiscible and the interfacial tension between water and oil is quite high. Persons skilled in the art of oil recovery have recognized this inherent weakness of water flooding, and additives have been described in the prior art for decreasing the interfacial tension between the injected water and the formation petroleum. For example, U. S. Pat. No. 2,233,381 (1941) disclosed the use of polyglycolethers as a surface active agent to increase the capillary displacement efficiency of an aqueous flooding medium. U. S. 3,302,713 discloses the use of a petroleum sulfonate type of anionic surfactant, prepared from the 850° to 1,050° F. boiling range fraction of petroleum for use in an oil recovery operation. U. S. Pat. No. 3,468,377 (1969) describes the use of petroleum sulfonates of specified molecular weight for oil recovery. Other surfactants which have been proposed for surfactant oil recovery include alkyl pyridinium, alkyl sulfates, alkyl sulfonates, and quaternary ammonium salts.

When the crude oil present in the formation is viscous, specifically having an API gravity below about 25°, recovery rs difficult even if the interfacial tension is reduced. To recover such viscous crudes, either thermal means (in situ combustion or steam injection) must be resorted to, or the petroleum must be emulsified in an oil-in-water emulsion having a viscosity substantially less than the petroleum. Emulsification is accomplished by injecting water to which caustic and an emulsifier are added into the formation. Many of the compounds used for interfacial tension reduction will function as an emulsifier in the proper concentration range and pH.

The above-identified surfactants appear effective in laboratory tests under controlled conditions for displacing oil from cores or sand packs, but field application has frequently been unsuccessful because of high salt contents or salinity encountered in formation water. Petroleum sulfonates are one of the most desirable surfactants for use in oil recovery operations because of their high surface activity and low unit cost, but these materials, like other surfactants which have heretofore been proposed for oil recovery operations, have a high sensitivity to salt content or salinity of the formation water. Petroleum sulfonates, for example, can be used only when the salinity of the formation water is not greater than about 2 percent by weight. When the formation water salinity is greater than about 2 percent, the surfactant is essentially ineffective for reducing the interfacial tension between the injected aqueous flooding medium and the formation petroleum, or for formation of an emulsion. Unfortunately, many subterranean petroleum containing formations contain water having salinities greater than 2 percent. Although some reduction of salinity can be accomplished by injecting relatively fresh water in a formation in advance of an aqueous surfactant solution, this is usually not satisfactory for several reasons. Most produced waters available in the oil field contain considerable salt content, and the most economical means of operating a water flooding operation involves the reinjection of the produced water. Moreover, even in those instances where relatively fresh water is available, fresh water preflushes are not particularly effective in displacing higher salinity formation waters.

Thus, it can be seen that there is a substantial and as yet unfulfilled need for a surfactant material suitable for use in oil recovery processes for reduction of interfacial tension between oil and water or for formation of a low viscosity oil-in-water emulsion, in the instance of high viscosity crude oil, which will effectively function in the presence of formation water salinity in excess of 2 percent by weight.

Another problem which reduces the total effectiveness of water flooding operations is poor sweep efficiency. Whereas the capillary displacement efficiency described above pertains to the problems associated with displacement of petroleum from a capillary flow channel by water which passes through the channel, poor sweep efficiency is associated with the inability to contact all of the petroleum containing flow channels with the injected aqueous fluid. Poor sweep efficiency results primarily from an adverse mobility ratio. The injected aqueous fluid generally has a substantially lower viscosity at reservoir conditions than the viscosity of the formation crude which it is intended to displace. A low viscosity fluid will not displace a high viscosity fluid uniformly and there is tendency for the injected low viscosity fluid to channel into the high viscosity fluid and bypass a substantial portion of high viscosity fluid. The displacement efficiency of an injected fluid can be related mathematically to the mobility ratio of the displacing and displaced fluid, and this mobility ratio is essentially determined by the viscosities of the injected and displaced fluids. The displacement efficiency is improved substantially if the injected fluid viscosity is increased to a value greater than the displaced fluid viscosity. This problem has also been recognized by persons skilled in the art of oil recovery, and various additives have been proposed to increase the viscosity of the injected fluid in order to improve the sweep efficiency. Hydrophilic polymers which have the effect of increasing the viscosity of the displacing fluid improve the mobility ratio and decrease the tendency for the injected fluid to channel into and inefficiently displace the higher viscosity petroleum. For example, U. S. Pat. No. 3,039,529 (1962) discloses the use polyacrylamide polymer to increase the viscosity of injected water to improve the mobility ratio and hence the displacement efficiency of water flooding type oil recovery processes. U. S. Pat. No. 3,282,337 describes the use of polyethylene oxide as a thickener for injected water for the same purpose. Polysaccharides such as are produced by microbial action on natural carbohydrates are also shown in the prior art for this purpose.

The combined use of a surfactant solution to decrease the surface tension between the injected aqueous fluid and the petroleum contained in the formation and a solution of hydrophilic polymeric material to increase the viscosity of the injected fluid and hence improve the mobility ratio and sweep efficiency, provide a very efficient petroleum recovery process. For example, U. S. Pat. No. 3,477,511 (1969) describes the use of a surfactant solution followed by a viscous fluid to displace a surfactant solution through the formation. Many other combinations of surfactant and water thickening polymers have been proposed, all sharing the common feature that the surfactant solution and the viscous fluid are essentially separate fluids and involve the injection of more than one slug of material into the formation.

Still another problem encountered in oil recovery operation is associated with the presence in the formation of water sensitive clay or clay-like minerals which swell on contact with fresh water. In formations having relatively marginal permeability initially, swelling of clay minerals within the formation can so drastically reduce the permeability of the formation as to reduce or completely terminate the further injection of fluid thereinto. Numerous materials, both organic and inorganic in nature, have been proposed for injecting into the subterranean petroleum containing formation in advance of the aqueous flooding medium for the purpose of desensitizing water sensitive clays. It is also known that the use of a relatively high salinity flooding medium will decrease the swelling of water sensitive clays in the formation, although unfortunately, this interferes with surfactants presently known for surfactant flooding. The dilemma created by the combined desire to decrease swelling of water sensitive clays and also to utilize a surfactant for the purpose of decreasing the interfacial tension between the injected aqueous fluid and the petroleum contained in the formation is sometimes solved by the use of organic materials such as amines, polyamines, or related compounds which do not interfere with subsequently injected surfactants. For example, U. S. Pat. No. 3,360,043 described the means of preventing formation damage associated with clay swelling by injecting into the formation a water soluble guanidine compound such as guanidine hydrochloride and a nonaqueous solvent such as methanol.

While the above-described materials have been used with limited success in certain applications, there is a substantial need for a surface active agent or surfactant suitable for use in oil recovery operations which is tolerant of higher levels of salinity than the presently used petroleum sulfonates. Moreover, the economics of tertiary recovery programs are always difficult to justify because of the enormous quantities of the various materials employed. If various reservoir problems of a particular petroleum containing formation require the use of separate additives for control of clay swelling for permeability loss prevention, interfacial tension reduction or emulsification, and injected fluid viscosity increase for mobility control, the cost becomes completely prohibitive. Accordingly, there is a need for a single composition which will accomplish several of these corrective functions in supplemental oil recovery operations 2imultaneously.

SUMMARY OF THE INVENTION

This invention concerns a surfactant flooding supplemental oil recovery process which involves the formulation of an aqueous solution of a water soluble guanidine compound such as guanidine or guanidine hydrochloride and a water soluble anionic surfactant. Examples of anionic surfactants suitable for use in this invention include soluble salts of alkyl sulfates having from 10 to 20 carbon atoms, such as sodium dodecyl sulfate or sodium cetyl sulfate. Water soluble salts of unsaturated aliphatic monobasic carboxylic acids having from 10 to 20 carbon atoms, such as sodium oleate (commonly referred to as soap) may also be used in the practice of this invention. Guanidine soaps, e.g., guanidine salts of unsaturated aliphatic carboxylic acids, may also be formulated and used in the practice of this invention. Examples of such guanidine soaps are guanidine oleate and guanidine linoleate.

Advantages resulting from the use of the above-described combination of materials include the following. The surface activity of the surfactant material is increased, to the extent that spontaneous emulsion of crudes which otherwise are not susceptible to emulsification result from the use of the above described solution. Another benefit realized by the use of the above-identified solution is in the increased salt tolerance of the surfactant solution. Whereas most surfactants usable for supplemental oil recovery operations have a salt tolerance of only about 2 percent by weight, the formulations of this invention are capable of effectively reducing interfacial tension between water and oil, and in some instances emulsifying water and oil in the presence of water having a salinity up to 4 percent by weight.

Still another benefit which accrues from the use of the subject invention is the increased viscosity of the surfactant solution which results from the dissolution of guanidine compounds therein. By effectively increasing the surfactant solution viscosity, improved mobility surfactant and sweep efficiency may be achieved without the use of a separate solution containing a hydrophilic polymer.

Furthermore, the presence of water soluble guanidine compounds in the injected fluid effectively desensitize water soluble clays present in the formation to prevent permeability damage resulting from clay swelling.

Ordinarily from about 0.02 to about 0.50 pore volumes of a solution containing from about 0.1 to about 2.0 percent by weight water soluble guanidine compound, from about 0.1 to about 2.0 percent by weight anionic surfactant, and from about 0.05 to about 5.0 percent by weight sodium hydroxide or other alkalinity agent will be injected into the formation. This solution is displaced through the formation by water injection.

DESCRIPTION OF THE PREFERRED EMBODIMENTS

This invention concerns a novel chemical surfactant system which can be used in formations having water salinities up to about 4 percent sodium chloride. Many petroleum containing formations which contain water having salinity in excess of about 2 percent by weight are known but cannot be subjected to surfactant flooding in order to recover larger quantities of petroleum from the formation than is possible with water flooding because surfactants presently known for oil recovery operations are ineffective when formation water salinity is above about 2 percent by weight.

We have found that an aqueous solution of two materials, in a critical concentration range, will effectively reduce the surface tension between oil and water, and will function efficiently in the presence of sodium chloride and other salts in a concentration up to about 4 percent by weight. By the use of this material, viscous crudes can be displaced by formation of a low viscosity oil-in-water emulsion. The chemical surfactant solution comprises:

1. A water soluble salt of an alkyl sulfate having from 10 to 20 carbon atoms, such as sodium dodecyl sulfate or sodium cetyl sulfate, or a water soluble salt of an unsaturated aliphatic monobasic carboxylic acid having from 10 to 20 carbon atoms such as sodium oleate or sodium elidate,
2. A water soluble guanidine compound, such as guanidine, guanidine hydrochloride, etc., and
3. An alkalinity agent such as sodium hydroxide.

The term "surfactant" is a broad definition which encompasses a large spectrum of compounds which share the following common characteristics:

1. The compound must be at least slightly soluble and at least one phase of a liquid system.
2. The compound must have an amphiphatic structure (the molecule is composed of groups with opposing solubility tendencies). Surfactants used in oil recovery operations have one or more hydrophobic or oil soluble groups and one or more hydrophilic or water soluble groups attached to the molecule.
3. The surfactant molecules or ions must tend to form oriented monolayers at phase interfaces.
4. The equilibrium concentrations of a surfactant in any particular solute at a phase interface is greater than the concentration of a surfactant in the bulk of the solution.
5. The material must tend to form micelles or aggregates of molecules or ions whenever the concentration of the material exceeds a certain limiting value, which is a characteristic of a particular surfactant and the solute in which it is dissolved.
6. The material must exhibit some combination of the following functional properties: detergency, foaming, wetting, emulsifying, solubilizing, and dispersing.

Surfactants are frequently referred to as anionic cationic, or nonionic. This designation refers to the hydrophilic or water soluble group or groups attached to the molecule. The anionic surfactants have anionic hydrophilic or water soluble groups such as carboxylates, sulfonates, sulfates, or phosphates. Anionic surfactants are the most important class of surfactants, and are the preferred surfactant for most applications including oil recovery unless there is some significant reason to resort to the use of a different kind of material. Aliphatic sulfonates, and particularly, sulfonates of petroleum fractions referred to as petroleum sulfonates, are currently very popular for surfactant flooding use. The anionic hydrophilic groups employed in the surfactants used in the present invention include sulfates and carboxylates.

Water soluble salts of unsaturated aliphatic monobasic carboxylic acids having the following general formula may be used as the anionic surfactant in the subject present invention.

$$CH_3 - (CH_2)_N - CH = CH - (CH_2)_M - COO - X \quad (1)$$

wherein N and M are integers and the sum of $(M + N)$ is equal to from 6 to 16, X is a metallic monovalent cation, ammonia or an amine. In the above formula when $M = 7$ and $N = 7$, and X is sodium, the material is sodium oleate, the sodium salt of oleic acid. Oleic acid is a common name for the *cis* geometrical isomeric form of the above-identified acid, and elaidic acid is the *trans* form of the same material. The *cis* form, oleic acid, is the form most commonly available of the two forms, although either form may be used in the subject invention.

Another class of compounds which may be used as the anionic surfactant in the present invention are those having the following general formula.

$$CH_3 - (CH_2)_P - SO_4 \cdot X \, Tm \quad (2)$$

wherein P is an integer from 9 to 19, and X is a metallic monovalent metallic cation, ammonia or an amine. When P is 11 and X is sodium, the material is sodium dodecyl sulfate. When P is 15 and X is sodium the material is sodium cetyl sulfate. Both materials have been found to be excellent surfactants for use in this invention.

Guanidine, the amidine of carbamic acid, has the following structure:

(3)

Guanidine may be synthesized from urea by alkylating the basic form of urea to form an imido ester of urea which reacts with ammonia to form guanidine. Guanidine is very soluble in water, and there are several water soluble salts of guanidine which can be used in the present invention. For example, guanidine hydrochloride, guanidine acetate, and guanidine sulfate are very soluble in water. In addition, guanidine carbonate, guanidine thiocyanate, and guanidine nitrate are sufficiently soluble in water to permit their use in the present invention. Guanidine hydrochloride is a particularly desirable guanidine compound, and is the material used in the tests to be described later in this specification.

The mechanism responsible for the improvement resulting from the use of a small amount of water soluble guanidine compound in the surfactant solution is not completely understood. There are references in the prior art indicating that guanidine reacts according to the following reaction:

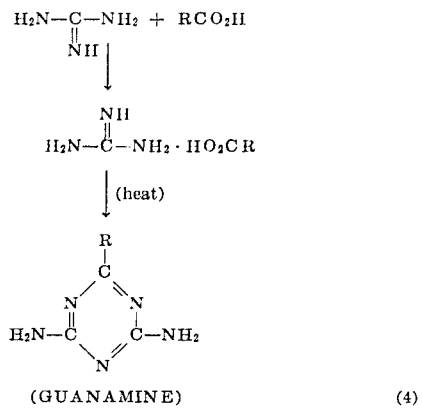

(GUANAMINE) (4)

It is possible that this reaction proceeds to some extent under the conditions present in the petroleum reservoir in the instance of using the unsaturated carboxylic acid derivatives and that a similar complex is formed with the aliphatic sulfate salts. Whether or not the above mechanism is responsible, however, we have determined that the inclusion in the solution of anionic surfactant solutions described above of a small amount of a water soluble guanidine compound will substantially improve the effectiveness of the anionic surfactant in the presence of high salinity water.

In practicing in this invention from about 0.02 to about 0.50 pore volumes of an aqueous solution containing from about 0.10 to about 2.0 percent guanidine hydrochloride and preferably from about 0.3 to about 0.8 percent guanidine hydrochloride, from about 0.1 to about 2.0 percent and preferably from 0.3 to about 0.80 percent by weight anionic surfactant, and from about 0.5 to about 5.0 percent by weight of an alkalinity agent such as sodium hydroxide is injected into the formations. Since the inclusion of guanidine compound in the surfactant solution increases the viscosity of the surfactant solution appreciably, it is generally not necessary to follow this material with a solution of hydrophilic polymer such as polyacrylamide. However, in instances of known severe mobility problems or adverse permeability distribution, it may be desirable to inject a quantity of water containing sufficient hydrophilic polymer to increase the viscosity of the water to a value somewhat greater than the surfactant solution previously injected. Finally, water is injected into the formation to displace the previously injected surfactant and guanidine solution and the oil displaced thereby, through the formation.

Ordinarily the use of surfactant agent in oil recovery operations results in the reduction of interfacial tension between the injected fluid and the petroleum contained in the reservoir, which increases the displacement efficiency appreciably. If the interfacial tension can be reduced essentially to zero, an emulsion can be formed wherein the continuous phase is the aqueous flooding medium and the dispersed phase is the petroleum sought to be recovered. This is desirable when the flooding is carried out in a reservoir containing very viscous crude which cannot be recovered ordinarily even if the interfacial tension between the injected aqueous displacing fluid and the petroleum is decreased substantially, since the viscosity of the petroleum itself in some instances is so high as to render the petroleum essentially immobile. We have found that the surfactant-guanidine solution of this invention is especially applicable to such instances where it is desired to form a water and oil emulsion for the purposes of recovering highly viscous oils. The novel surfactant-guanidine solution of this invention is especially useful in that it permits the formation of an emulsion in the presence of formation water containing up to 4 percent by weight sodium chloride or other interfering salts.

The implementation of the present invention can be more fully understood by reference to the following field example, which is offered only for purposes of illustration and is not intended to be limitative or restrictive of the invention, which will be defined more fully hereinafter in the claims.

A subterranean, petroleum containing formation is located at a depth of 8,000 feet. The formation is 40 feet thick and the porosity is 30 percent. The field is exploited first by primary production, utilizing a square grid pattern with 500 foot line spacing between wells. At the conclusion of primary recovery, which recovers only 25 percent of the original petroleum in place in the reservoir, injection wells are drilled into the center of each square pattern to convert the field to an inverted five spot pattern for water injection. Although a large field commonly contains a multiplicity of square grid patterns each 500 feet on a side and each having an injection well in the center, it is possible to analyze the entire field by considering only a single square grid unit. Water is injected into the injection wells and production of oil is accomplished via the production wells until the water-oil ration reaches 30, which is considered to be the upper economic limit for continued production. At the conclusion of the water flooding operation, only 45 percent of the original oil in place in the reservoir is recovered, and some form of tertiary recovery must be resorted to in order to recover any significant portion of the remaining petroleum.

The total pore volume swept by the injected fluid equals 500 feet × 500 feet × 40 feet × 0.30 × 0.70 = 2.1 million cubic feet A 0.10 pore volume slug, comprising 0.21 million cubic feet or 1.57 million gallons of an aqueous solution containing 0.50 percent guanidine hydrochloride, 0.50 percent sodium oleate, and 0.20 percent sodium hydroxide, is injected into the formation. Water is injected into the formation to disperse the guanidine-surfactant solution, together with the displaced oil through the formation toward the production wells. Water injection is continued until the water-oil ratio again rises to about 30, at which point the residual oil saturation is 12 percent and approximately 84 percent of the original oil in place has been recovered by means of primary, secondary, and tertiary recovery.

Experimental

In order to establish the operability of the present invention, and further to determine the optimum concentrations of the various constitutients employed therein, the following experimental work was performed.

In order to study the relationship between the viscosity of an aqueous solution of anionic surfactants and water soluble guanidine compounds, a series of solutions were prepared and the viscosities of these solutions were determined. The measured viscosities of 15 solutions containing various concentrations of sodium dodecyl sulfate, sodium chloride, and guanidine hydrochloride are contained in Table I below.

TABLE I

| Sample Number | Percent Sodium Dodecyl Sulfate | Percent Sodium Chloride | Percent Guanidine Hydrochloride | Viscosity Centipoise |
|---|---|---|---|---|
| 1 | 0 | 0 | 0 | 1 |
| 2 | 0.96 | 1.92 | 0.19 | 1.4 |
| 3 | 0.93 | 1.85 | 0.38 | 3.5 |
| 4 | 0.89 | 1.78 | 0.54 | 8.2 |
| 5 | 0.88 | 1.72 | 0.69 | 10.1 |
| 6 | 0.83 | 1.66 | 0.83 | 24.8 |
| 7 | 0.48 | 1.92 | 0.19 | 1.1 |
| 8 | 0.46 | 1.85 | 0.38 | 1.5 |
| 9 | 0.45 | 1.78 | 0.54 | 2.0 |
| 10 | 0.43 | 1.72 | 0.69 | 2.3 |
| 11 | 0.42 | 1.66 | 0.83 | 4.3 |
| 12 | 0.24 | 1.92 | 0.19 | 1.08 |
| 13 | 0.23 | 1.85 | 0.38 | 1.15 |
| 14 | 0.22 | 1.78 | 0.54 | 1.21 |
| 15 | 0.21 | 1.72 | 0.69 | 1.30 |
| 16 | 0.20 | 1.66 | 0.83 | 1.39 |

As can be seen from the data in Table I, the viscosities vary from 1.08 centipoise to 24.8 centipoise, and generally increase with increasing concentration of guanidine hydrochloride and decrease with increasing concentrations of sodium chloride.

When crude oil is encountered which is more viscous than about 25° API, it cannot be recovered without decreasing the viscosity thereof by one of two means. Thermal stimulation techniques such as in situ combustion or steam injection may be utilized to heat the crude oil and thereby reducing the viscosity, or an oil and water emulsion may be formed utilizing the crude oil, the viscosity of said emulsion being substantially less than the original viscosity of the crude. Certain crude oils contain natural emulsifying ingredients, so that a satisfactory emulsion may be formulated by injecting water plus an alkalinity agent such as sodium hydroxide into the formation. When a crude oil is determined not to be spontaneously emulsifiable by contact with alkaline water, some form of extraneous emulsifier must be utilized. Richfield crude oil from the Richfield Unit, Orange County, Calif., is an example of a viscous crude oil which is particularly difficult to emulsify.

A series of tests were performed utilizing Richfield crude oil. For use in this test, a guanidine soap was synthesized by reacting guanidine carbonate with oleic acid anhydride, heating a solution to force the evolution of carbon dioxide, to form guanidine oleate.

A series of emulsification tests were performed using Richfield crude oil and various concentrations of guanidine oleate, and sodium hydroxide. In some instances quinoline was added to enhance emulsion formation. The tests were performed by mixing 1 milliliter of Richfield crude oil with 5 milliliters of the aqueous solution to be tested. An evaluation of the tendency to emulsify prior to any agitation was made based on the visual observation. The container was then shaken and again an evaluation of the emulsification tendency was made based on a visual observation of the emulsification. The results are contained in Table II below.

TABLE II

EMULSION TESTS RICHFIELD CRUDE OIL

| Run | Percent Guanidine Oleate | Sodium Hydroxide Normality | Quinoline Water | Emulsification Initial | Tendency Shaken |
|---|---|---|---|---|---|
| 17 | 0 | 0 | 0 | none | none |
| 18 | 0.10 | 0 | 0 | none | none |
| 19 | 0 | 0.02 | 0 | none | poor |
| 20 | 0.01 | 0.02 | 0 | good | good |
| 21 | 0.02 | 0.02 | 0 | good | good |
| 22 | 0.03 | 0.02 | 0 | good | good |
| 23 | 0.04 | 0.02 | 0 | good | good |
| 24 | 0.05 | 0.02 | 0 | good | excellent |
| 25 | 0.10 | 0.02 | 0 | good | excellent |
| 26 | 0 | 0 | saturated | none | none |
| 27 | 0.01 | 0 | saturated | none | none |
| 28 | 0.10 | 0 | saturated | none | none |
| 29 | 0 | 0.02 | saturated | good | good |
| 30 | 0.01 | 0.02 | saturated | good | very good |
| 31 | 0.02 | 0.02 | saturated | good | excellent |
| 32 | 0.04 | 0.02 | saturated | good | excellent |
| 33 | 0.06 | 0.02 | saturated | good | excellent |

It can be seen from the data contained in Table II that Richfield crude oil does not spontaneously emulsify, nor can emulsification be had using guanidine oleate without an alkalinity agent such as sodium hydroxide, nor will the material emulsify using sodium hydroxide without guanidine oleate. Excellent emulsification is obtained using 0.05 percent guanidine oleate and 0.02 normality sodium hydroxide. By utilizing a cold tar solvent such as quinoline, good to excellent emulsification can be obtained using slightly less guanidine oleate. The emulsions obtained in this series of tests were quite stable.

Another series of emulsion tests were performed similar to those described above, except the crude oil sample obtained from the Bob Slaughter Field, West Texas. This crude is an exceptionally difficult crude oil to emulsify. The data contained in Table III below indicate emulsification with sodium hydroxide alone was not achieved, nor was it possible to obtain a satisfactory emulsion using guanidine oleate without sodium hydroxide. Poor to good emulsions were formed using guanidine and alkaline water. Fair to good emulsions were observed with guanidine and quinoline water, and fair to good emulsions were noted using guanidine oleate, sodium hydroxide and quinoline water together.

TABLE III

EMULSIFICATION TESTS SLAUGHTER CRUDE OIL

| Run | Percent Guanidine Oleate | Sodium Hydroxide Normality | Quinoline | Emulsification Initial | Shaken |
|---|---|---|---|---|---|
| 34 | 0 | 0.02 | 0 | poor | fair |
| 35 | 0.10 | 0 | 0 | none | none |
| 36 | 0.01 | 0.02 | 0 | poor | fair |
| 37 | 0.10 | 0.02 | 0 | poor | good |
| 38 | 0 | 0 | saturated | poor | fair |
| 39 | 0.04 | 0 | saturated | poor | good |
| 40 | 0 | 0.02 | saturated | poor | fair |
| 41 | 0.01 | 0.02 | saturated | good | good |
| 42 | 0.02 | 0.02 | saturated | good | good |
| 43 | 0.03 | 0.02 | saturated | fair | good |
| 44 | 0.10 | 0.02 | saturated | fair | good |

As can be seen from the data contained in Table III above, considerable variation from one field to another in emulsification response to the chemical treatment is observed, and indeed this is quite normal. It is preferable that samples of crude oil from any proposed test be evaluated to determine its response to the treating chemicals described in this invention.

Another series of laboratory tests were performed to determine the oil recovery efficiency resulting from displacing Richfield crude oil obtained from the Richfield unit, Orange County, Calif. The displacements were conducted in consolidated cores taken from a different but similar formation, and comparative tests were performed using both linear and radial cores. The radial core was 6.375 inches long, 4.0 inches in diameter, and the interior bore diameter was 0.50 inches. The porosity was 16.1 percent and permeability was 122 millidarcies average. The linear core was 5.875 inches long, 2.57 inches in diameter, and had a porosity of 27 percent and a permeability of 806 millidarcies average. It was determined in other tests that the optimum concentration of sodium hydroxide was 0.10 normal, and this concentration was used in all of the tests containing sodium hydroxide.

The first of these two series of tests utilizing the linear core was performed, and the data therefore is contained in Table IV below. A synthetic produced water composed of 1.53 grams per liter of sodium chloride and 1.64 per liter of sodium bicarbonate was utilized in Run 45 in a conventional water displacement test, and resulted in only 48 percent oil recovery. Addition of sufficient sodium hydroxide to produce an 0.1 normal solution in this synthetic produced water was utilized in Run 46 and resulted in 64 percent oil recovery. Addition of 0.5 percent guanidine oleate to the injected fluid used in Run 46 increased the oil recovery to 67 percent. Runs 48 and 49 were performed utilizing an actual sample of produced water, and the results were somewhat surprising. It can be seen that actual produced water containing 0.1 normal sodium hydroxide resulted in an oil recovery efficiency of only 53.7 percent whereas addition of 0.5 percent guanidine oleate to the produced water plus 0.1 normal sodium hydroxide resulted in a final oil recovery of 65.3 percent. Although the synthetic produced water was formulated so as to match the analysis of the actual sample of produced water quite closely, the results were significantly different.

TABLE IV
DISPLACEMENT TESTS RICHFIELD CRUDE OIL IN A LINEAR CORE

| Run | Injected Fluid | Initial Oil Saturation | Residual Oil Saturation | Percent Oil Recovery |
|---|---|---|---|---|
| 45 | Synthetic Produced Water[1] | 74.1 | 38.1 | 48.0 |
| 46 | 0.1 Normal NaOH + Synthetic Produced Water | 74.4 | 26.5 | 64.0 |
| 47 | 0.1 Normal NaOH + 0.5 percent Guanidine Oleate | 77.0 | 25.2 | 67.0 |
| 48 | 0.1 Normal NaOH[2] | 78.5 | 35.0 | 53.7 |
| 49 | 0.1 Normal NaOH[2] 0.5 percent Guanidine Oleate | 77.2 | 27.1 | 65.3 |

[1]Distilled water to which was added 1.53 grams per liter NaCl plus 1.64 grams/liter NaHCO₃
[2]Added to actual sample of produced water Another series of tests were performed essentially similar to that described above, except using the radial core. The data for this series of tests are contained in Table V below, and again indicate that the percent oil recovery is greater using 0.5 guanidine oleate plus 0.1 normal sodium hydroxide than using 0.1 normal sodium hydroxide alone.

TABLE V
DISPLACEMENTS TESTS RICHFIELD CRUDE OIL IN A RADIAL CORE

| Run | Injected Fluid | Initial Oil Saturation | Residual Oil Saturation | Percent Oil Recovery |
|---|---|---|---|---|
| 50 | Synthetic Produced Water[1] | 68.4 | 32.8 | 52.2 |
| 51 | 0.1 N.NaOH in Synthetic Produced Water[1] | 66.8 | 29.0 | 56.8 |
| 52 | 0.1 N.NaOH + .5 percent Guanidine Oleate in Synthetic Produced Oil | 68.1 | 25.7 | 62.3 |
| 53 | 0.1 N.NaOH in Richfield Produced Water | 70.8 | 34.5 | 51.2 |
| 54 | 0.1 Normal NaOH + 0.5 percent Guanidine Oleate in Richfield Produced Water | 69.0 | 29.7 | 56.8 |

[1]Distilled water to which was added 1.53 grams per liter NaCl plus 1.64 grams/liter NaHCO₃

Another series of displacement tests were performed in sandstone cores using 24.7°API crude oil and produced water from the Pontotoc Sands of the Hewitt Hoxbar Unit, Carter County, Oklahoma. A conventional water flood using produced water was performed and the data are contained in Table VI. In another test, produced water to which was added 0.5 percent sodium oleate, 0.5 percent guanidine hydrochloride and 0.2 percent sodium hydroxide were added, was injected into the core. Initial and residual oil saturations and percent oil recovery after injection of 1, 2 and 3 pore volumes of fluid injection are given in Table VI below.

TABLE VI
Displacement results Hewitt Hoxbar unit crude oil in limestone cores

| | | | 1 pore volume | | 2 pore volumes | | 3 pore volumes | |
|---|---|---|---|---|---|---|---|---|
| Run | Injected fluid | Initial So | Residual So | Percent recovery | Residual So | Percent recovery | Residual So | Percent recovery |
| 55 | Produced water | 69.0 | 44.0 | 36.2 | 39.5 | 42.8 | 36.5 | 47.0 |
| 56 | Produced water plus sodium oleate, guanidine hydrochloride and sodium hydroxide | 68.0 | 27.0 | 60.0 | 22.5 | 67.0 | 20.0 | 70.0 |

It can be seen that the use of sodium oleate, guanidine hydrochloride and sodium hydroxide resulted in recovering substantially more oil than did the produced water flood.

Thus we have shown and demonstrated in a plurality of laboratory experiments that improved surfactant flooding can be achieved by the use of either an alkaline aqueous solution containing a guanidine compound such as guanidine hydrochloride and an anionic surfactant such as sodium dodecyl sulfate or sodium oleate, or by the use of an alkaline aqueous solution of a guanidine soap such as guanidine oleate. This improved mixture results in rapid formation of stable oil and water emulsions which is especially useful for supplemental oil recovery operations in the instance of crude oil which is too viscous to recover by simple water displacement, and which is difficult to emulsify because of the presence in the formation of water containing an excessive amount of sodium chloride or other interfering salts. While several specific embodiments of this invention have been disclosed in the examples presented herein, numerous other variations

We claim:

1. A method for recovering petroleum from a subterranean, petroleum containing formation comprising:
injecting into said formation an aqueous solution comprising a water soluble guanidine compound and an anionic surfactant selected from the group consisting of water soluble salts of alkyl sulfates having from ten to twenty carbon atoms and water soluble salts of unsaturated aliphatic carboxylic monobasic acids having from ten to twenty carbon atoms.

2. A method as recited in claim 1 wherein the water soluble guanidine compound is selected from the group consisting of guanidine, quanidine hydrochloride, quanidine acetate, guanidine sulfate, guanidine carbonate, guanidine thiocyanate, and guanidine nitrate.

3. The method of claim 2 wherein the water soluble guanidine compound is guanidine hydrochloride.

4. The method of claim 2 wherein the water soluble guanidine compound is guanidine carbonate.

5. A method as recited in claim 1 wherein the concentration of water soluble guanidine compound is from about 0.10 percent to about 2.0 percent by weight.

6. A method as recited in claim 1 wherein the concentration of water soluble guanidine compound is from about 0.3 percent to about 0.8 percent by weight.

7. A method as recited in claim 1 wherein the water soluble salt of an alkyl sulfate has the following formula:

$$CH_3-(CH_2)_P-SO_4-X$$

wherein P is an integer from 9 to 19 and X is selected from the group consisting of nonovalent metallic ions, ammonia and amines.

8. The method of claim 7 wherein the water soluble salt of an alkyl sulfate is sodium dodecyl sulfate.

9. The method of claim 7 wherein the water soluble salt of an alkyl sulfate is sodium cetyl sulfate.

10. A method as recited in claim 1 wherein the salt of the unsaturated aliphatic monobasic acid has the following formula:

$$CH_3-(CH_2)_N-CH=CH-(CH_2)_M-COO-X$$

wherein M and N are integers and the sum of M and N is from 6 to 16, and X is selected from the group consisting of metallic monovalent ions, ammonia, and amines.

11. The method of claim 10 wherein the salt of an unsaturated aliphated monobasic carboxylic acid is sodium oleate.

12. The method of claim 10 wherein the salt of an unsaturated aliphatic monobasic carboxylic acid is sodium elaideate.

13. The method of claim 1 wherein the concentration of the salt of the unsaturated, aliphatic monobasic carboxylic acid is from about 0.1 to about 2.0 percent by weight.

14. The method of claim 1 wherein the concentration of the salt of the unsaturated aliphatic monobasic carboxylic acid is from about 0.3 to about 0.8 percent by weight.

15. A method as recited in claim 1 wherein the solution also contains from about 0.05 to about 5.0 percent by weight of an alkalinity agent.

16. The method of claim 15 wherein the alkalinity agent is sodium hydroxide.

17. A method as recited in claim 1 wherein from about 0.02 to about 0.50 pore volumes of the guanidine compound and surfactant containing solution is injected into the formation.

18. A method as reicted in claim 1 comprising the additional step of displacing the guanidine compound and surfactant containing solution by injecting water into the formation.

19. A method as recited in claim 1 wherein the aqueous solution also contains quinoline.

20. A method of recovering petroleum from a subterranean, petroleum containing formation comprising:
injecting into said formation an aqueous solution comprising an alkalinity agent and a guanidine salt of an unsaturated aliphatic carboxylic acid having from ten to twenty carbon atoms.

21. A method as recited in claim 20 wherein the guanidine salt of an unsaturated aliphatic carboxylic acid is guanidine oleate.

* * * * *

UNITED STATES PATENT OFFICE
CERTIFICATE OF CORRECTION

Patent No. 3,796,266                    Dated March 12, 1974

Inventor(s) Joseph T. Carlin; Kenoth H. Flournoy; Ricardo L. Cardenas

It is certified that error appears in the above-identified patent and that said Letters Patent are hereby corrected as shown below:

Column 2, Line 11 reads "rs" and should read --is--.

Colum 4, Line 34 reads "2imultaneously" and should read --simultaneously--.

Column 6, Line 53 reads "$CH_3 - (CH_2)_p - SO_4$ X Tm (2) and should read --$CH_3 - (CH_2)_p - SO_4 \cdot$ X Column 12, Line 20 reads "Synthetic Produced Oil68.1 and should have --68.1-- under the column in the table headed "Initial Oil Saturation".

Signed and sealed this 5th day of November 1974.

(SEAL)
Attest:

McCOY M. GIBSON JR.                    C. MARSHALL DANN
Attesting Officer                      Commissioner of Patents